United States Patent
Yoo (10) Patent No.: US 12,373,677 B2
(45) Date of Patent: Jul. 29, 2025

(54) NEURAL PROCESSOR AND CONTROL METHOD OF NEURAL PROCESSOR

(71) Applicants: Samsung Electronics Co., Ltd., Suwon-si (KR); SNU R&DB FOUNDATION, Seoul (KR)

(72) Inventor: Sungjoo Yoo, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 1052 days.

(21) Appl. No.: 17/372,658

(22) Filed: Jul. 12, 2021

(65) Prior Publication Data
US 2022/0284273 A1    Sep. 8, 2022

(30) Foreign Application Priority Data

Mar. 4, 2021 (KR) .................. 10-2021-0028933
Mar. 19, 2021 (KR) .................. 10-2021-0035736

(51) Int. Cl.
| | |
|---|---|
| *G06N 3/063* | (2023.01) |
| *G06F 7/499* | (2006.01) |
| *G06F 7/50* | (2006.01) |
| *G06F 7/523* | (2006.01) |
| *G06F 7/544* | (2006.01) |

(52) U.S. Cl.
CPC .......... *G06N 3/063* (2013.01); *G06F 7/4991* (2013.01); *G06F 7/50* (2013.01); *G06F 7/523* (2013.01); *G06F 7/5443* (2013.01); *G06F 2207/4824* (2013.01)

(58) Field of Classification Search
CPC ....... G06F 7/4991; G06F 7/523; G06F 7/5443
See application file for complete search history.

(56) References Cited

U.S. PATENT DOCUMENTS

| | | | |
|---|---|---|---|
| 9,710,748 B2 | 7/2017 | Ross et al. | |
| 10,599,398 B2 | 3/2020 | Olsen | |
| 10,614,354 B2 | 4/2020 | Aydonat et al. | |
| 10,671,349 B2 | 6/2020 | Bannon et al. | |
| 2018/0157465 A1* | 6/2018 | Bittner | G06F 5/012 |
| 2020/0074285 A1 | 3/2020 | Kim et al. | |
| 2020/0104692 A1 | 4/2020 | Hill et al. | |

FOREIGN PATENT DOCUMENTS

| | | |
|---|---|---|
| KR | 10-2020-0022384 A | 3/2020 |
| KR | 10-2020-0026455 A | 3/2020 |
| KR | 10-2020-0059153 A | 5/2020 |
| KR | 10-2020-0093404 A | 8/2020 |

OTHER PUBLICATIONS

Korean Office Action Issued on Feb. 23, 2023, in Counterpart Korean Patent Application No. 10-2021-0035736 (2 Pages in English, 4 Pages in Korean).

* cited by examiner

*Primary Examiner* — Michael D. Yaary
(74) *Attorney, Agent, or Firm* — NSIP Law (57) ABSTRACT

A neural processor and a control method of the neural processor are provided. The neural processor includes plurality of processing element groups, wherein each of the processing element groups includes a plurality of processing elements configured to perform a vector operation, an overflow accumulator configured to be engaged by a processing element in which an overflow or underflow occurs from among the plurality of processing elements, and a register configured to store information indicating the processing element as an owner processing element.

20 Claims, 4 Drawing Sheets

NEURAL PROCESSOR AND CONTROL METHOD OF NEURAL PROCESSOR

CROSS-REFERENCE TO RELATED APPLICATIONS

This application claims the benefit under 35 U.S.C. § 119(a) of Korean Patent Application No. 10-2021-0028933 filed on Mar. 4, 2021, and Korean Patent Application No. 10-2021-0035736 filed on Mar. 19, 2021, in the Korean Intellectual Property Office, the entire disclosures of which are incorporated herein by reference for all purposes.

BACKGROUND

1. Field

The following description relates to a neural processor and a control method of the neural processor.

2. Description of Related Art

A hardware accelerator configured with a neural processing unit (NPU) for an application of an artificial intelligence field may implement a dot product operation between two vectors. The NPU may use an adder and an accumulator with a large number of bits to perform a dot product operation and to store a result of an operation. To implement a dot product operation, a multiplier, an accumulator, and an adder may be used. For example, when the NPU performs an operation of 8 bits or greater, the cost of the multiplier may increase, whereas when a degree of precision of the operation is reduced to be less than 8 bits, the cost of the accumulator and the adder may relatively increase in comparison to the cost of the multiplier. Thus, there is a demand for a method of reducing a cost of an accumulator and an adder to efficiently implement an NPU for performing a low-precision operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network including a plurality of processing element groups, wherein each of the processing element groups includes a plurality of processing elements configured to perform a vector operation, an overflow accumulator configured to be engaged by a processing element in which an overflow or underflow occurs from among the plurality of processing elements, and a register configured to store information indicating the processing element as an owner processing element.

The overflow accumulator may be configured to accumulate an operation result of an accumulator of the owner processing element based on information that indicates whether an overflow occurs or whether an underflow occurs and that is received from an accumulator of the owner processing element.

The information may include any one or any combination of information indicating that the overflow occurs, information indicating that the underflow occurs, and information indicating that no overflow or underflow occurs.

The overflow accumulator may be connected to each of the plurality of processing elements through a pipelined interconnection.

The neural network may be configured to determine, based on the information indicating the owner processing element, whether the overflow accumulator is engaged by at least one of the plurality of processing elements.

In response to the overflow accumulator being determined to be engaged, the neural network may be configured to control "1" to be added to the overflow accumulator based on an overflow signal output from the owner processing element, and control "1" to be subtracted from the overflow accumulator based on an underflow signal output from the owner processing element.

In response to the overflow accumulator being determined to be unengaged, the neural network may be configured to set a processing element that outputs an overflow signal or an underflow signal from among the plurality of processing elements as the owner processing element.

The owner processing element may be configured to output the information indicating the owner processing element together with an operation result of the overflow accumulator and an operation result of the owner processing element in response to a termination of the vector operation.

Each of the plurality of processing elements, other than the owner processing element, may be configured to output an operation result of an accumulator of each of the non-owner processing elements in response to a termination of the vector operation.

In response to the overflow signal or the underflow signal being simultaneously received from at least two processing elements from among the plurality of processing elements, the neural network may be configured to randomly set one of the at least two processing elements as the owner processing element.

The register may be configured to further store information indicating whether an overflow occurs or an underflow occurs in the owner processing element.

Each of the plurality of processing elements may include a plurality of multipliers, a plurality of adders, and an accumulator.

Each of the plurality of processing elements may include a multiplier-adder tree (MAT), an adder, and an accumulator.

The overflow accumulator may include an accumulator and an adder.

In another general aspect, there is provided a control method of a neural network, the method including determining whether an overflow accumulator shared by processing elements that perform a vector operation is engaged by at least one of the plurality of processing elements, setting a processing element that outputs an overflow signal or an underflow signal from among the plurality of processing elements as an owner processing element, in response to the overflow accumulator being determined to be unengaged, controlling the overflow accumulator to be added or subtracted based on a signal output from the owner processing element that engages the overflow accumulator, in response to the overflow accumulator being determined to be engaged, and outputting information indicating the owner processing element together with an operation result of the overflow accumulator and an operation result of the owner processing element, in response to a termination of the vector operation.

The determining may include determining, based on the information indicating the owner processing element, whether the overflow accumulator is engaged by at least one of the plurality of processing elements.

The controlling may include, in response to the overflow accumulator being determined to be engaged adding "1" to the overflow accumulator based on an overflow signal output from the owner processing element, and subtracting "1" from the overflow accumulator based on an underflow signal output from the owner processing element.

The outputting may include outputting a result obtained by summing data of the overflow accumulator and an operation result of the owner processing element through a pipelined interconnection that vertically connects the owner processing element and the overflow accumulator.

The method may include randomly setting one of the at least two processing elements as the owner processing element, in response to the overflow signal or the underflow signal being simultaneously received from at least two processing elements among the plurality of processing elements.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. Regarding the reference numerals assigned to the components in the drawings, it should be noted that the same components will be designated by the same reference numerals, and redundant descriptions thereof will be omitted.

Figure 1:
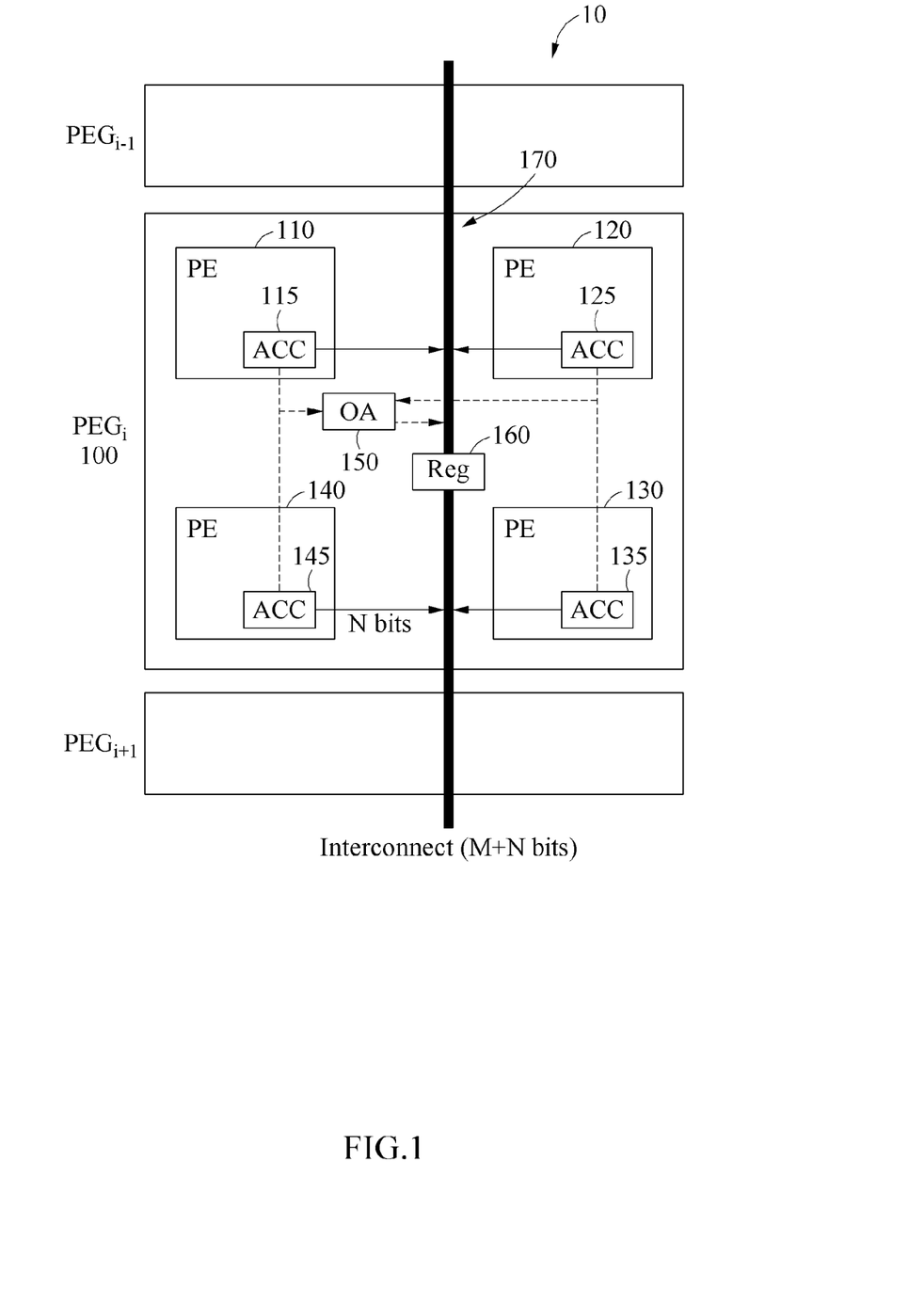
FIGS. 1 and 2 illustrate examples of a configuration of a neural processor.

FIG. 1 illustrates an example of a configuration of a neural processor. FIG. 1 illustrates a structure of a neural processor 10 including a plurality of processing element groups ("PEG") with a systolic array architecture.

Each of processing element groups $PEG_{i-1}$, $PEG_i$ 100, and $PEG_{i+1}$ may have a systolic array architecture designed so that cells having the same function form a connection network and perform a single operation according to an entire synchronization signal. In an example, the functions and operations of each of the processing element groups may be the same. Hereinafter, a configuration and an operation of the processing element group $PEG_i$ 100 among the processing element groups $PEG_{i-1}$, $PEG_i$ 100, and $PEG_{i+1}$ will be described. The configuration and the operation of the processing element group $PEG_i$ 100 may equally be applicable to the other processing element groups PEG, for example, the processing element groups $PEG_{i-1}$, and $PEG_{i+1}$.

The processing element group $PEG_i$ 100 may include a plurality of processing elements (PEs) 110, 120, 130, and 140, an overflow accumulator OA 150, and a register Reg 160. In an example, the plurality of PEs 110 to 140 that share a single overflow accumulator, that is, the overflow accumulator OA 150 may be referred to as a "processing element group PEG".

The plurality of PEs 110 to 140 may perform a vector operation. The vector operation may include, for example, a dot product operation between two vectors, however, there is no limitation thereto. An example in which the processing element group PEG$_i$ 100 includes four PEs, for examples, the PEs 110 to 140, is described for convenience of description in FIG. 1, however, there is no limitation thereto. For example, a number of PEs included in one processing element group, for example, the processing element group PEG$_i$ 100, may be "2", "8" or "16".

A PE may also be referred to as a "dot product engine (DPE)" or an "accelerator" in that a vector operation, for example, a dot product operation between vectors is implemented in hardware.

The PEs 110 to 140 may include accumulators ACC 115, 125, 135, and 145, respectively. Although not shown, the PEs 110 to 140 may further include a plurality of multipliers and a plurality of adders, respectively, in addition to the accumulators ACC 115, 125, 135, and 145. For example, the PEs 110 to 140 may transmit operation results (for example, a partial sum or a final result of a dot product) of the accumulators ACC 115, 125, 135, and 145 to the outside through a pipelined interconnection. In this example, the accumulators ACC 115, 125, 135, and 145 and the plurality of adders that are respectively included in the PEs 110 to 140 may be implemented with a small number of bits.

Depending on examples, each of the PEs 110 to 140 may also include a multiplier-adder tree (MAT), an adder, and an accumulator. An example in which each PE includes a MAT, an adder, and an accumulator will be further described below with reference to FIG. 2.

The overflow accumulator OA 150 may be shared by the PEs 110 to 140, and may be occupied or engaged by a PE in which an overflow or an underflow occurs during the vector operation among the PEs 110 to 140.

The overflow accumulator OA 150 may receive 2-bit information (for example, information indicating that an overflow occurs, information indicating that an underflow occurs, or information indicating that no overflow or underflow occurs) from the accumulators ACC 115, 125, 135, and 145 of "N" bits that are respectively included in the PEs 110 to 140. The overflow accumulator OA 150 may accumulate an operation result of one of the accumulators ACC 115, 125, 135, and 145 based on the received 2-bit information.

The overflow accumulator OA 150 may be connected to each of the PEs 110 to 140 through a pipelined interconnection indicated by a dashed line. The pipelined interconnection may be connected to an interconnection line 170.

When each of the PEs 110 to 140 transmits N-bit data that is data of the accumulators ACC 115, 125, 135, and 145 to the outside through the pipelined interconnection, the overflow accumulator OA 150 may output an operation result of "M" bits of the overflow accumulator OA 150 according to a clock cycle in which an operation result of "N" bits of the accumulators ACC 115, 125, 135, and 145 is output, to allow data of "M+N" bits to be transmitted to the outside through the interconnection line 170.

For example, when each of the PEs 110 to 140 has "10" bits, and when the overflow accumulator OA 150 has "10" bits, the interconnection line 170 may transmit data of "54" bits in total by adding information (2 bits) indicating an owner PE and information (2 bits) indicating whether an overflow occurs or whether an underflow occurs to "50" bits in total. The expression "owner PE" used herein may be understood as one PE that occupies the overflow accumulator OA 150 among the PEs 110 to 140 constituting a single processing element group. In this example, the remaining PEs that do not occupy the overflow accumulator OA 150 among the PEs 110 to 140 may be referred to as "non-owner PEs".

Although not shown, the overflow accumulator OA 150 may include an accumulator and an adder.

The register Reg 160 may store information indicating an owner PE that occupies the overflow accumulator OA 150. The information indicating the owner PE may have "2" bits, for example, "00", "01", "10", or "11", and may indicate one of the PEs 110 to 140. For example, "00" may indicate that the PE 110 is an owner PE, and "01" may indicate that the PE 120 is an owner PE. Also, "10" may indicate that the PE 130 is an owner PE, and "11" may indicate that the PE 140 is an owner PE.

Also, the register Reg 160 may further store 2-bit information indicating whether an overflow or an underflow occurs in an owner PE. For example, "01" may indicate that an overflow occurs, and "10" may indicate that an underflow occurs. Also, "00" may indicate that no overflow or underflow occurs.

The neural processor 10 may determine whether the overflow accumulator OA 150 is occupied or engaged by a PE every clock cycle by assuming that a PE in which an overflow signal or an underflow signal occurs first is assumed to occupy an overflow accumulator. The neural processor 10 may determine, based on the information indicating the owner PE, whether the overflow accumulator OA 150 shared by the plurality of PEs 110 to 140 that perform the vector operation is occupied by at least one of the plurality of PEs 110 to 140.

In an example, when the overflow accumulator OA 150 is not occupied, the neural processor 10 may set a PE that first outputs an overflow signal or an underflow signal among the PEs 110 to 140 as an owner PE.

In another example, when the overflow accumulator OA 150 is occupied, the neural processor 10 may control "1" to be added to the overflow accumulator OA 150 based on an overflow signal output from the owner PE. The neural processor 10 may control "1" to be subtracted from the overflow accumulator OA 150 based on an underflow signal output from the owner PE. In an example, a signal to control 1" to be added to or subtracted from the overflow accumulator OA 150 may be transmitted through a control logic (not shown) of the neural processor 10.

In an example, the control logic may generate an output control signal in response to a termination of the vector operation. When the output control signal is received, the owner PE may transmit a result of an operation of the owner PE through the interconnection line 170 according to a clock cycle, and a result of an operation of the overflow accumulator OA 150 may be transmitted through the interconnection line 170 according to the same clock cycle.

The owner PE may output the information indicating the owner PE, together with the operation result of the owner PE and the operation result of the overflow accumulator OA 150, in response to the termination of the vector operation.

Non-owner PEs obtained by excluding an owner PE from PEs may output operation results of accumulators of the non-owner PEs through the interconnection line 170, in response to the termination of the vector operation.

When overflow signals or underflow signals are simultaneously received from at least two PEs among the plurality of PEs 110 to 140, the neural processor 10 may randomly set one of the at least two PEs as an owner PE.

In an example, considering that a large number of bits is rarely used to store a result of a dot product operation, costs (that is, a number of gates of an accumulator and an adder using an accumulator and an adder with a small number of bits) of an accumulator and an adder may be reduced. In an example, when each of four PEs, for example, the PEs 110 to 140, includes an accumulator and an adder with "M+N" bits, costs of accumulators and adders may correspond to "4(M+N)" bits. In another example, when the four PEs, for example, the PEs 110 to 140 share a single M-bit overflow accumulator, for example, the overflow accumulator OA 150, and each include an N-bit accumulator, a total cost of each of accumulators and adders included in a single processing element group may be represented as "4N+M" bits. In this example, the cost may be reduced by "3M" bits, in comparison to an example in which each of the PEs 110 to 140 includes an accumulator and an adder with "M+N" bits. The interconnection line 170 may also reduce the cost (for example, a number of pipeline-interconnected wires) at the same proportion.

In an example, a plurality of PEs, for example, the PEs 110 to 140, may be configured with accumulators and adders that use a relatively small number of bits, and an owner PE in which an overflow or an underflow occurs among the plurality of PEs may be allowed to occupy and use the overflow accumulator OA 150, thereby enhancing an efficiency while reducing costs of the accumulators and the adders.

Figure 2:
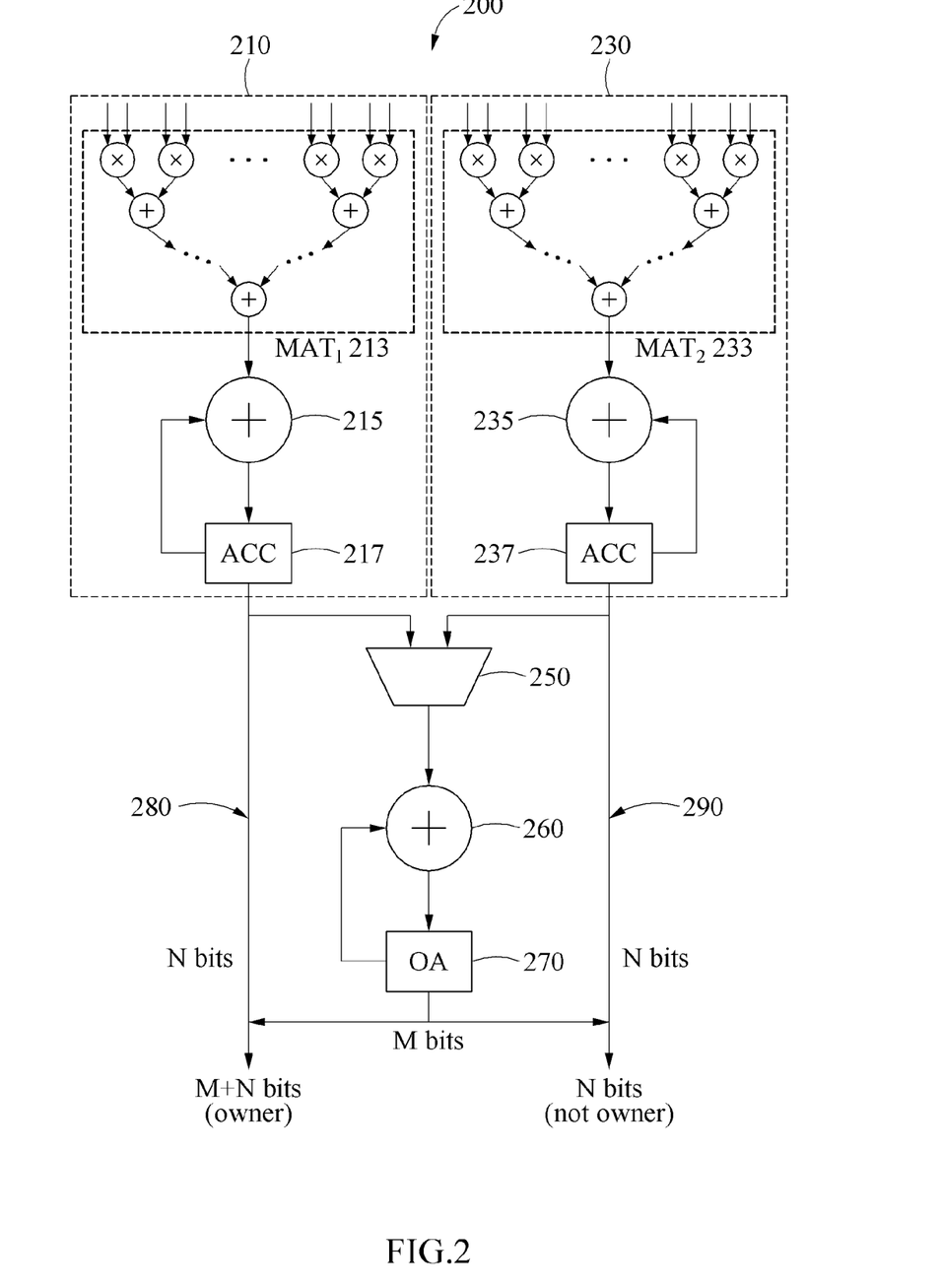

FIG. 2 illustrates another example of a configuration of a neural processor. FIG. 2 illustrates a neural processor 200 in which two PEs 210 and 230 share a single overflow accumulator, for example, an overflow accumulator 270.

In an example, the two PEs 210 and 230 include accumulators ACC 217 and 237 of "N" bits, respectively, and that the overflow accumulator 270 has "M" bits. In this example, the two PEs 210 and 230 may include MATs 213 and 233, adders 215 and 235 of "N" bits, and the accumulators ACC 217 and 237 of "N" bits, respectively.

The overflow accumulator 270 may include an M-bit adder 260 and an M-bit accumulator.

For example, the PE 210 may be assumed as an owner PE that occupies the overflow accumulator 270 and the PE 230 may be assumed as a non-owner PE that does not occupy the overflow accumulator 270.

The owner PE 210 may output an operation result of "M+N" bits by summing an operation result of "N" bits of the accumulator ACC 217 and an operation result of "M" bits of the overflow accumulator 270. The owner PE 210 may output an operation result with a high precision. The operation result of "M" bits provided by the overflow accumulator 270 may correspond to an operation result of the owner PE 210 selected by a 2-to-1 multiplexer (MUX) 250 based on information indicating an owner PE.

The owner PE 210 may output the operation result of "M+N" bits through a pipelined interconnection 280.

The non-owner PE 230 may output an operation result of "N" bits of the accumulator ACC 237. In the non-owner PE 230, the operation result of "N" bits of the accumulator ACC 237 in an output of "M+N" bits may be output as a valid result. The non-owner PE 230 may output an operation result with a low precision. In an M-th bit corresponding to a most significant bit, numbers may be added through, for example, a sign extension operation of increasing a number of bits of a binary number while maintaining a value and a sign (positive or negative) of a number. The non-owner PE 230 may output the operation result of "N" bits through a pipelined interconnection 290.

Figure 3:
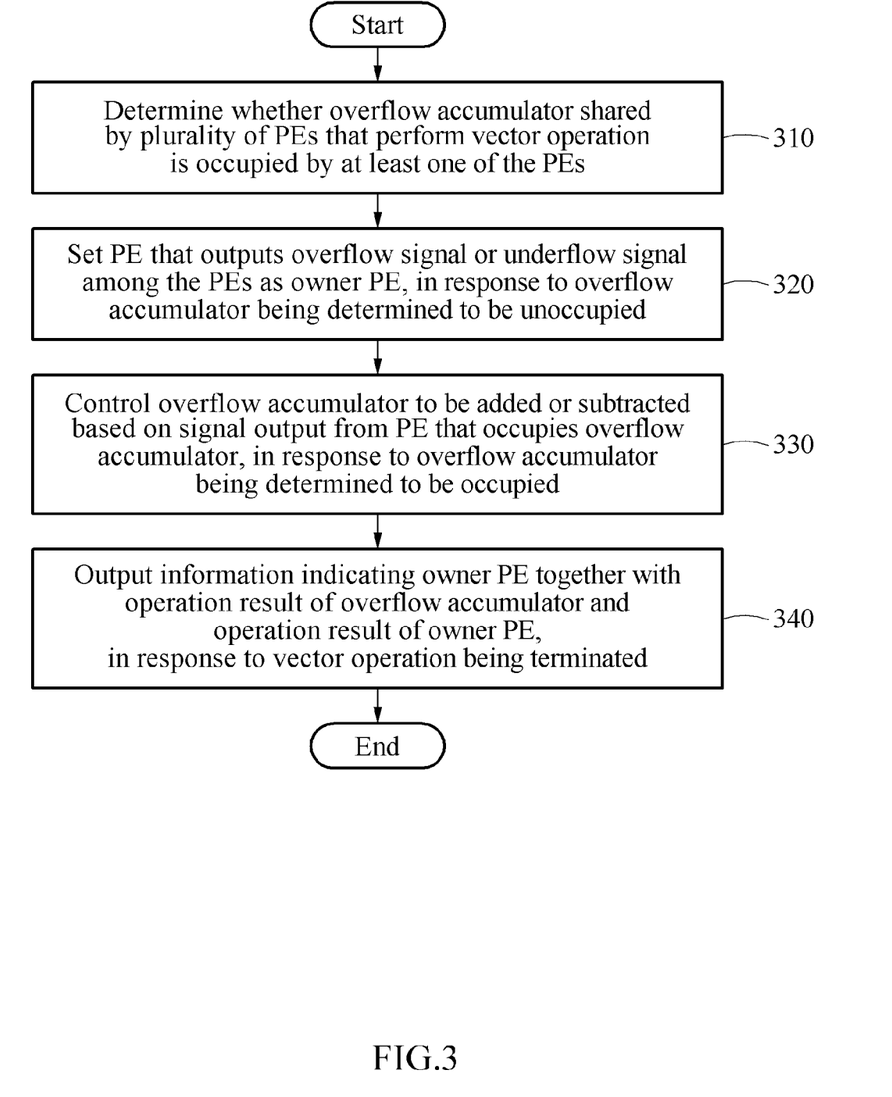
FIGS. 3 and 4 illustrate examples of a control method of a neural processor.

FIG. 3 illustrates an example of a control method of a neural processor. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. FIG. 3 illustrates a process in which the neural processor outputs an operation result through operations 310 to 340. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, the neural processor may determine whether an overflow accumulator shared by a plurality of PEs that perform a vector operation is occupied by at least one of the plurality of PEs. For example, the neural processor may determine, based on information indicating an owner PE, whether the overflow accumulator is occupied by at least one of the plurality of PEs.

When the overflow accumulator is determined to be unoccupied in operation 310, the neural processor may set a PE that outputs an overflow signal or an underflow signal among the PEs as an owner PE in operation 320.

When overflow signals or underflow signals are simultaneously received from at least two PEs among the plurality of PEs, the neural processor may randomly set one of the at least two PEs as an owner PE.

When the overflow accumulator is determined to be occupied in operation 310, the neural processor may control the overflow accumulator to be added or subtracted based on a signal output from an owner PE that occupies the overflow accumulator in operation 330. The signal output from the owner PE may be, for example, an overflow signal or an underflow signal. For example, when the overflow accumulator is occupied, the neural processor may add "1" to the overflow accumulator based on an overflow signal output from a PE that occupies the overflow accumulator, or may subtract "1" from the overflow accumulator based on an underflow signal output from the PE that occupies the overflow accumulator.

In operation 340, the neural processor may output information indicating the owner PE together with an operation result of the overflow accumulator and an operation result of the owner PE, in response to the vector operation being terminated. The neural processor may output a result obtained by summing data of the overflow accumulator and the operation result of the owner PE to the outside through a pipelined interconnection that vertically connects the owner PE and the overflow accumulator.

Figure 4:
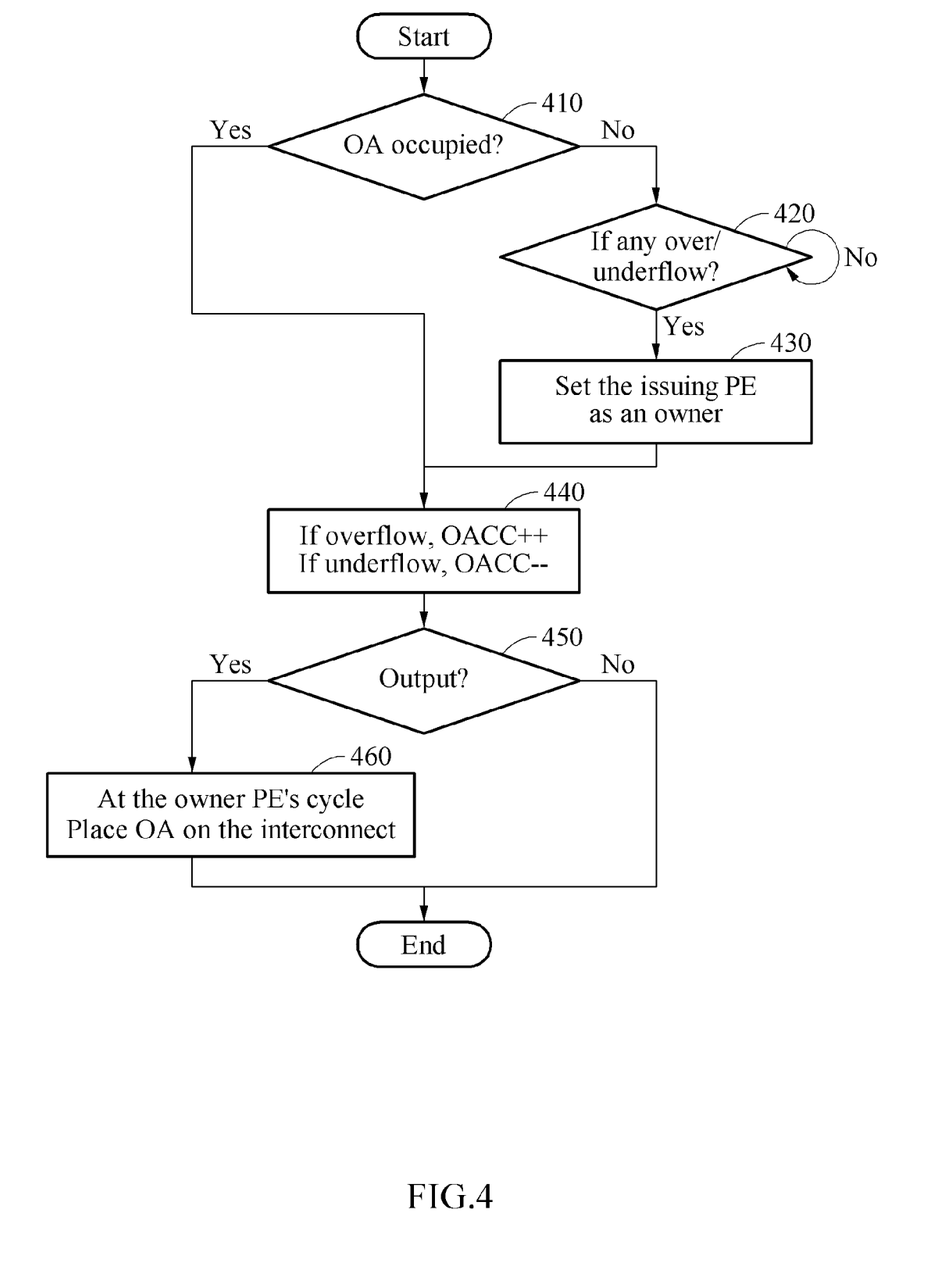

FIG. 4 illustrates another example of a control method of a neural processor. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. FIG. 4 illustrates operations performed by an overflow accumulator of the neural processor for each cycle through operations 410 to 460. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, the neural processor may determine whether an overflow accumulator shared by a plurality of PEs that perform a vector operation is occupied by at least one of the PEs.

When the overflow accumulator is determined to be occupied by at least one PE in operation 410, the neural processor may add "1" to or subtract "1" from the overflow accumulator (for example, an accumulator OACC included in the overflow accumulator) based on an overflow signal or an underflow signal output from an owner PE that occupies the overflow accumulator in operation 440. When the overflow signal is output from the owner PE, the neural processor may add "1" to the overflow accumulator. When the underflow signal is output, the neural processor may subtract "1" from the overflow accumulator.

When the overflow accumulator is determined to be unoccupied by at least one PE in operation 410, in operation 420, the neural processor may determine whether an overflow signal or an underflow signal is received.

When the overflow signal or the underflow signal is determined not to be received in operation 420, the neural processor may wait for the overflow signal or the underflow signal to be received. Depending on examples, when the overflow signal or the underflow signal is determined not to be received in operation 420, the neural processor may reperform operation 410 to determine whether the overflow accumulator is occupied by at least one of the plurality of PEs.

When the overflow signal or the underflow signal is determined to be received in operation 420, the neural processor may set a PE that outputs the overflow signal or the underflow signal as an owner PE in operation 430.

When at least two overflow signals or at least two underflow signals are determined to be simultaneously received in operation 420, the neural processor may randomly set one of PEs that output the overflow signals or the underflow signals as an owner PE.

In operation 440, the neural processor may add "1" to or subtract "1" from the overflow accumulator based on the overflow signal or the underflow signal output from the owner PE set in operation 430.

In operation 450, the neural processor may determine whether an output control signal is generated from a control logic, in response to the vector operation being terminated. When the output control signal is determined not to be generated in operation 450, the neural processor may terminate an operation.

When the output control signal is determined to be generated in operation 450, the neural processor may output an operation result of the overflow accumulator through a pipeline interconnection according to a clock cycle, and may also output an operation result of the owner PE in the same clock cycle through the pipeline interconnection in operation 460. Also, the neural processor may output information indicating the owner PE together with the operation result of the overflow accumulator and the operation result of the owner PE.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the control method of a neural network. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network comprising:
   a plurality of processing element groups,
   wherein each of the processing element groups comprises:
      a plurality of processing elements configured to perform a vector operation;
      an overflow accumulator configured to be engaged by a processing element in which an overflow or underflow occurs from among the plurality of processing elements; and
      a register configured to store information indicating the processing element from among the plurality of processing element as an owner processing element that is engaging the overflow accumulator.

2. The neural network of claim 1, wherein the overflow accumulator is further configured to accumulate an operation result of an accumulator of the owner processing element based on information that indicates whether an overflow occurs or whether an underflow occurs and that is received from an accumulator of the owner processing element.

3. The neural network of claim 2, wherein the information comprises any one or any combination of information indicating that the overflow occurs, information indicating that the underflow occurs, and information indicating that no overflow or underflow occurs.

4. The neural network of claim 1, wherein the overflow accumulator is directly connected to each of the plurality of processing elements through a pipelined interconnection.

5. The neural network of claim 1, wherein the neural network is configured to determine, based on the information indicating the owner processing element, whether the overflow accumulator is engaged by at least one of the plurality of processing elements.

6. The neural network of claim 5, wherein in response to the overflow accumulator being determined to be engaged, the neural network is further configured to:
   control "1" to be added to the overflow accumulator based on an overflow signal output from the owner processing element; and
   control "1" to be subtracted from the overflow accumulator based on an underflow signal output from the owner processing element.

7. The neural network of claim 5, wherein in response to the overflow accumulator being determined to be unengaged, the neural network is further configured to set a processing element that outputs an overflow signal or an underflow signal from among the plurality of processing elements as the owner processing element.

8. The neural network of claim 1, wherein the owner processing element is further configured to output the information indicating the owner processing element together with an operation result of the overflow accumulator and an operation result of the owner processing element in response to a termination of the vector operation.

9. The neural network of claim 1, wherein each of the plurality of processing elements, other than the owner processing element, are configured to output an operation result of an accumulator of each of the non-owner processing elements in response to a termination of the vector operation.

10. The neural network of claim 1, wherein in response to the overflow signal or the underflow signal being simultaneously received from at least two processing elements from among the plurality of processing elements, the neural network is configured to randomly set one of the at least two processing elements as the owner processing element.

11. The neural network of claim 1, wherein the register is further configured to further store information indicating whether an overflow occurs or an underflow occurs in the owner processing element.

12. The neural network of claim 1, wherein each of the plurality of processing elements comprises a plurality of multipliers, a plurality of adders, and an accumulator.

13. The neural network of claim 1, wherein each of the plurality of processing elements comprises a multiplier-adder tree (MAT), an adder, and an accumulator.

14. The neural network of claim 1, wherein the overflow accumulator comprises an accumulator and an adder.

15. A control method of a neural network, the method comprising:
  determining whether an overflow accumulator shared by a plurality of processing elements that perform a vector operation is engaged by at least one of the plurality of processing elements;
  setting, a processing element that outputs an overflow signal or an underflow signal from among the plurality of processing elements as an owner processing element that engages the overflow accumulator, in response to the overflow accumulator being determined to be unengaged;
  controlling the overflow accumulator to be added or subtracted based on a signal output from the owner processing element that engages the overflow accumulator, in response to the overflow accumulator being determined to be engaged; and
  outputting information indicating the owner processing element together with an operation result of the overflow accumulator and an operation result of the owner processing element, in response to a termination of the vector operation.

16. The method of claim 15, wherein the determining comprises determining, based on the information indicating the owner processing element, whether the overflow accumulator is engaged by at least one of the plurality of processing elements.

17. The method of claim 15, wherein the controlling comprises, in response to the overflow accumulator being determined to be engaged:
  adding "1" to the overflow accumulator based on an overflow signal output from the owner processing element; and
  subtracting "1" from the overflow accumulator based on an underflow signal output from the owner processing element.

18. The method of claim 15, wherein the outputting comprises outputting a result obtained by summing data of the overflow accumulator and an operation result of the owner processing element through a pipelined interconnection that vertically connects the owner processing element and the overflow accumulator, where the plurality of processing elements and the overflow accumulator are directly connected to each other through the pipelined interconnection.

19. The method of claim 15, further comprising:
  randomly setting one of the at least two processing elements as the owner processing element, in response to the overflow signal or the underflow signal being simultaneously received from at least two processing elements among the plurality of processing elements.

20. A non-transitory computer-readable storage medium storing instructions that, when executed by a processor, cause the processor to perform the method of claim 15.

* * * * *